United States Patent [19]

White et al.

[11] Patent Number: 4,846,687

[45] Date of Patent: Jul. 11, 1989

[54] SIGN LANGUAGE BLOCKS

[76] Inventors: Pamela S. White; Phillip S. White, both of 20 Lawnwood Ave., Schenectady, N.Y. 12304

[21] Appl. No.: 255,944

[22] Filed: Oct. 11, 1988

[51] Int. Cl.[4] .......................... G09B 1/10; G09B 21/00
[52] U.S. Cl. .................................. 434/112; 434/167; 434/403
[58] Field of Search ............... 434/112, 159, 167, 168, 434/172, 403

[56] References Cited

U.S. PATENT DOCUMENTS

| | | | |
|---|---|---|---|
| 1,465,637 | 8/1923 | Goss | 434/403 |
| 2,483,833 | 10/1949 | Levin | 434/159 |
| 3,010,228 | 11/1961 | Torre | 434/168 |
| 3,380,176 | 4/1968 | Kling et al. | 434/168 X |
| 3,858,333 | 1/1975 | Kopp | 273/272 |
| 4,003,144 | 1/1977 | Maddestra et al. | 434/403 |

FOREIGN PATENT DOCUMENTS

1021094  2/1966  United Kingdom ................ 434/167

Primary Examiner—William H. Grieb
Attorney, Agent, or Firm—Leon Gilden

[57] ABSTRACT

Educational sign language blocks are set forth as an educational tool to enable individuals to enhance an understanding of sign language, as typically utilized by hearing impaired individuals. The individual sign language blocks each include a designated letter of the alphabet and an associated symbol corresponding to that letter to reinforce the noted alphabet letter and further including a removable side face including the appropriate sign language designation for the aforenoted letter. The removal faces are each provided with three projections to correspond to three recesses within an associated face of the block. The pattern of recesses and projections are varied for each of the individual blocks whereupon an individual attempting to associate the appropriate sign language symbol with the designation or letter on the block must choose correctly or else the removable face will not mate due to misalignment of the projections and recesses.

7 Claims, 9 Drawing Sheets

SIGN LANGUAGE BLOCKS

BACKGROUND OF THE INVENTION

1. Field of the Invention

The field of invention relates to educational tools, and more particularly pertains to a new and improved series of sign language blocks to enhance educational individuals to the use of appropriate sign language.

2. Description of the Prior Art

The use of educational tools for a variety of purposes is well known in the prior art. Such devices have typically included complex organizations that have tended to discourage their application and utilization by a broad spectrum of individuals. Other tools have been of relatively simplistic organizations that did not provide appropriate incentive to the learning of the desired information. Devices in this category have included items such as "flash cards", and the like. Examples of such organizations may be found in U.S. Pat. Nos. 1,286,361; 2,491,883; 2,824,389; 3,769,721; and 2,440,205.

The instant invention sets forth a unique interrelationship of removable faces associated with educational blocks to overcome the deficiencies of prior art and as such, it may be appreciated that there is a continuing need for a new and improved series of sign language blocks that overcome the deficiencies of the prior art devices and includes the positive characteristics of ease of use as well as effectiveness and in this respect, the present invention substantially fulfills this need.

SUMMARY OF THE INVENTION

In view of the foregoing disadvantages inherent in the known types of learning devices now present in the prior art, the present invention provides sign language blocks wherein the same are provided with removable faces formed with various attaching means to an associated block to require proper association of a particular sign language representation with an appropriate designation for that sign language. As such, the general purpose of the present invention, which will be described subsequently in greater detail, is to provide new and improved sign language blocks which have all the advantages of the prior art educational devices and none of the disadvantages.

To attain this, the present invention comprises a series of blocks formed with removable faces. The faces are provided with projections extending orthogonally and outwardly of a rearward surface of the removable face. The projections are provided with a certain pattern to only dock with a predesignated block provided with recesses corresponding to the geometric configuration and positioning of the projections to reinforce proper association of a sign language indication within an associated block.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved sign language blocks which have all the advantages of the prior art sign language blocks and none of the disadvantages.

It is another object of the present invention to provide new and improved sign language blocks which may be easily and efficiently manufactured and marketed.

It is a further object of the present invention to provide new and improved sign language blocks which are of a durable and reliable construction.

An even further object of the present invention is to provide new and improved sign language blocks which are susceptible of a low cost of manufacture with regard to both materials and labor, and which accordingly is then susceptible of low prices of sale to the consuming public, thereby making such sign language blocks economically available to the buying public.

Still yet another object of the present invention is to provide new and improved sign language blocks which provide in the apparatuses and methods of the prior art some of the advantages thereof, while simultaneously overcoming some of the disadvantages normally associated therewith.

Still another object of the present invention is to provide new and improved sign language blocks wherein the same are provided with removable faces provided with predesignated representations associated with blocks providing such designations.

Yet another object of the present invention is to provide a new and improved sign language block arrangement wherein the same are provided with removable faces and projections projecting rearwardly thereof to mate with a companion series of recesses to reinforce association of particular sign language designation with such designation positioned on the block surfaces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7a is an orthographic illustration of the various letters in sign language designations therefore.

FIG. 7b is an isometric illustration of the sign language designations positioned on removable faces secured to associated blocks.

DESCRIPTION OF THE PREFERRED EMBODIMENT

With reference now to the drawings, and in particular to FIGS. 1 to 8 thereof, a new and improved sign language blocks embodying the principles and concepts of the present invention and generally designated by the reference numeral 10 will be described.

Figures 1, 2, 3A:
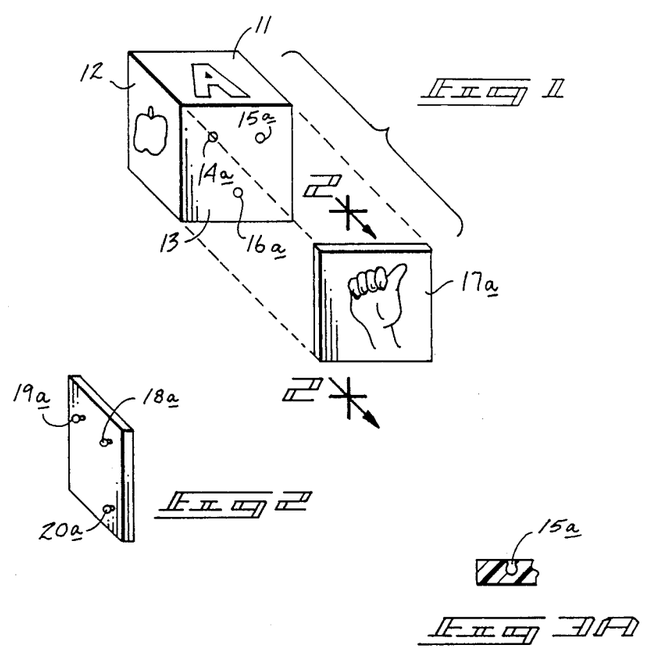
FIG. 1 is an isometric illustration of a single sign language block of the instant invention.
FIG. 2 is an isometric illustration of a typical rear surface and associated projections of a removable face of the sign language blocks.
FIG. 3a is an orthographic view taken along the lines 3a–3a of FIG. 3 in the direction indicated by the arrows.
Figure 1A:
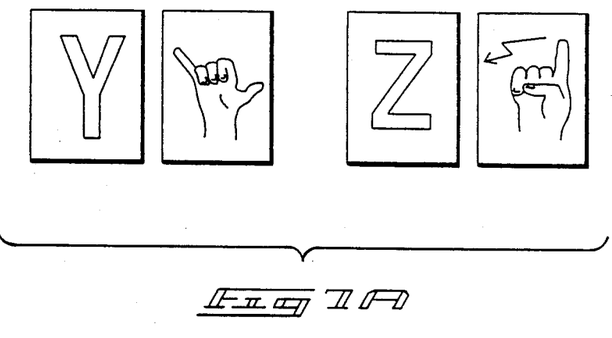
Figure 1B:
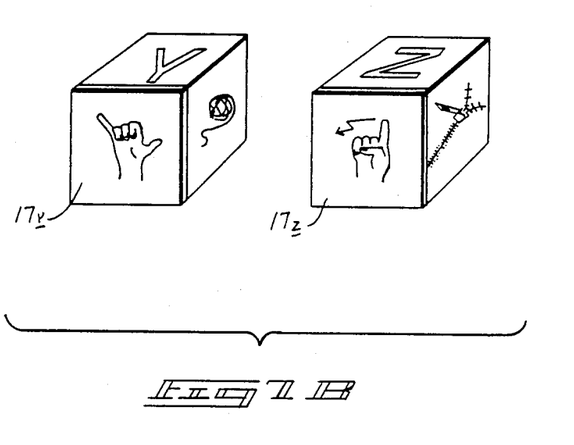
Figure 3:
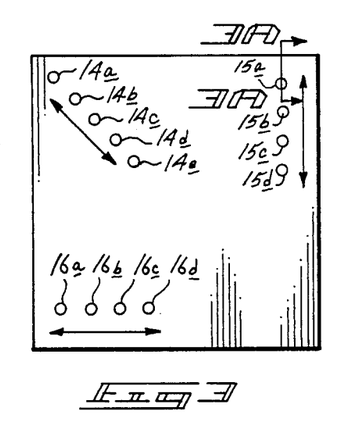
FIG. 3 is an orthographic diagrammatic illustration setting forth the various arrangements of recesses provided in the receiving surfaces of the sign language blocks to accept the removable face and associated projections.
Figure 3B:
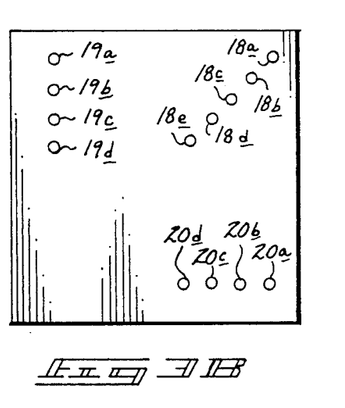
FIG. 3b is a diagrammatic illustration of the mating pattern of various projections to be orthogonally secured onto a rear surface of the removable faces.
Figure 4A:
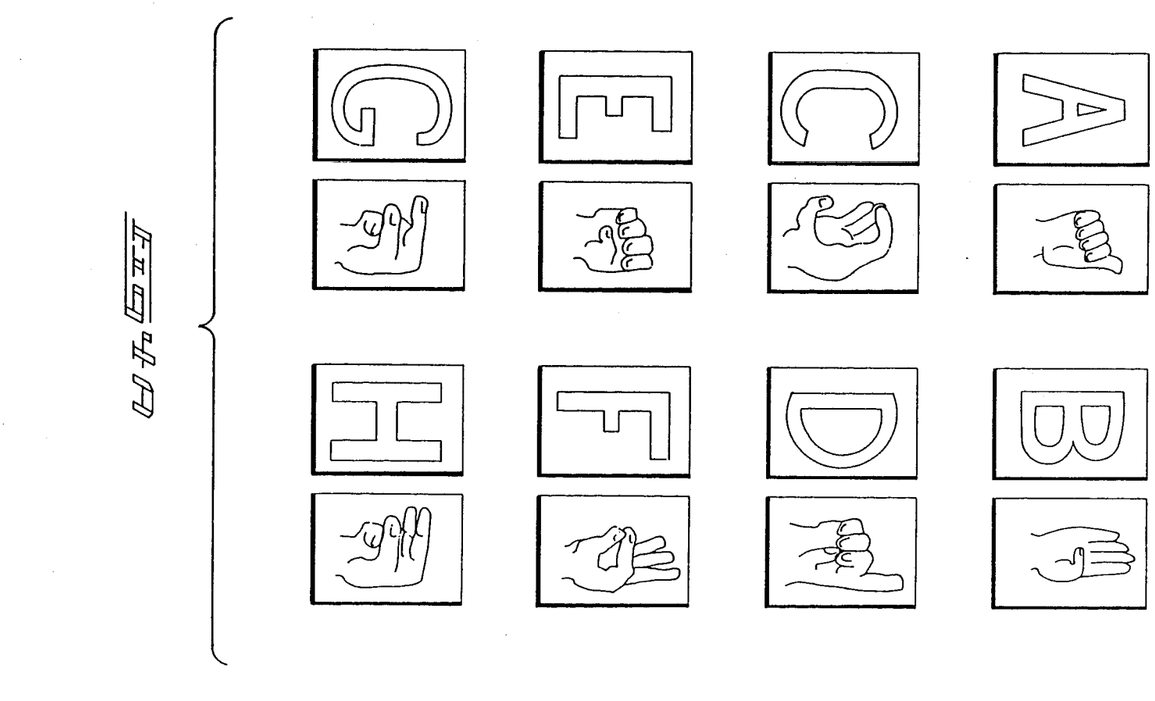
FIG. 4a is illustrative of the various letters and associated sign language designations therefore.
Figure 4B:
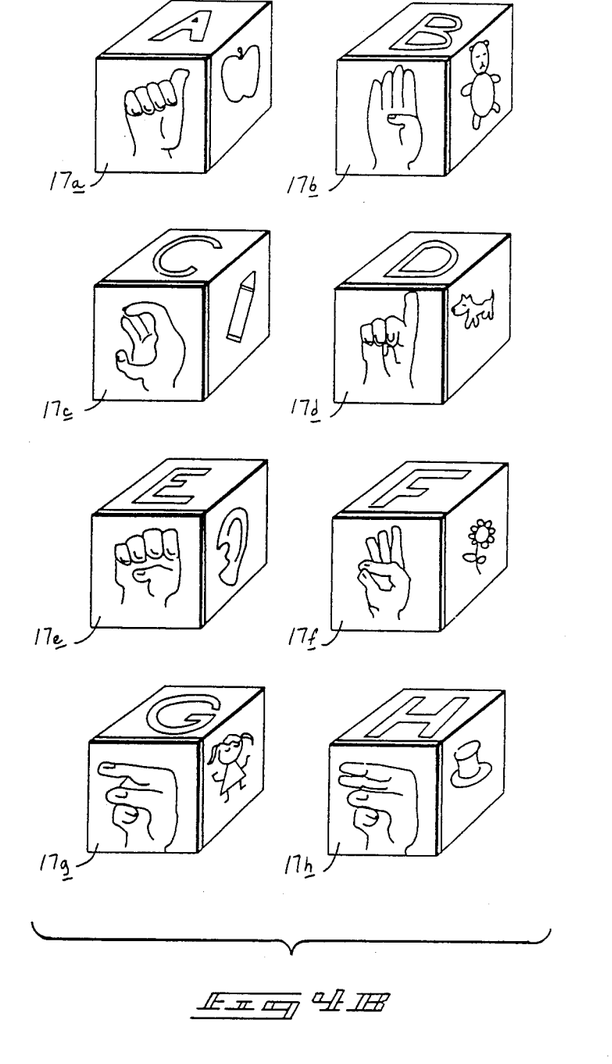
FIG. 4b is an isometric illustration of a series of sign language blocks and associated sign language designations with removable faces secured thereto.
Figure 5A:
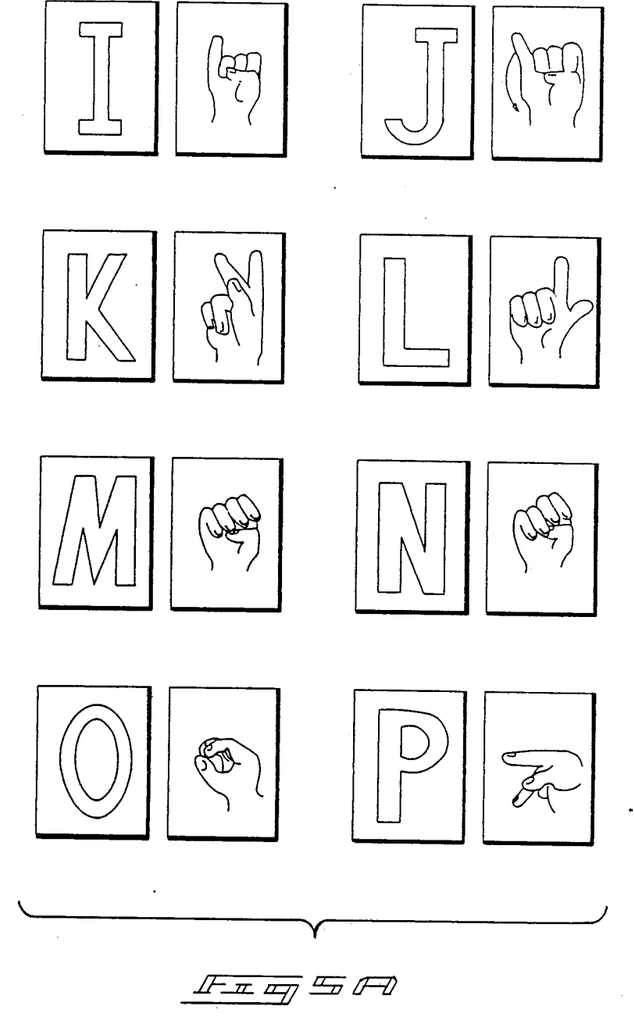
FIG. 5a is an orthographic illustration of the various letters and associated sign language designations therefore.
Figure 5B:
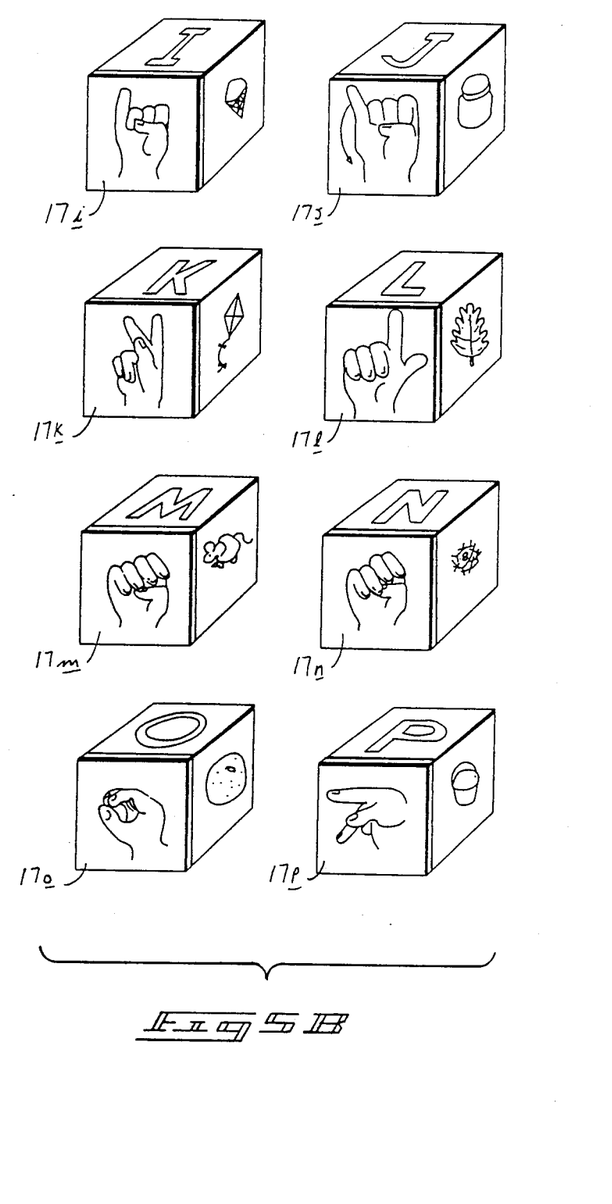
FIG. 5b is an isometric illustration of the various sign language designation faces secured to associated blocks.
Figure 6A:
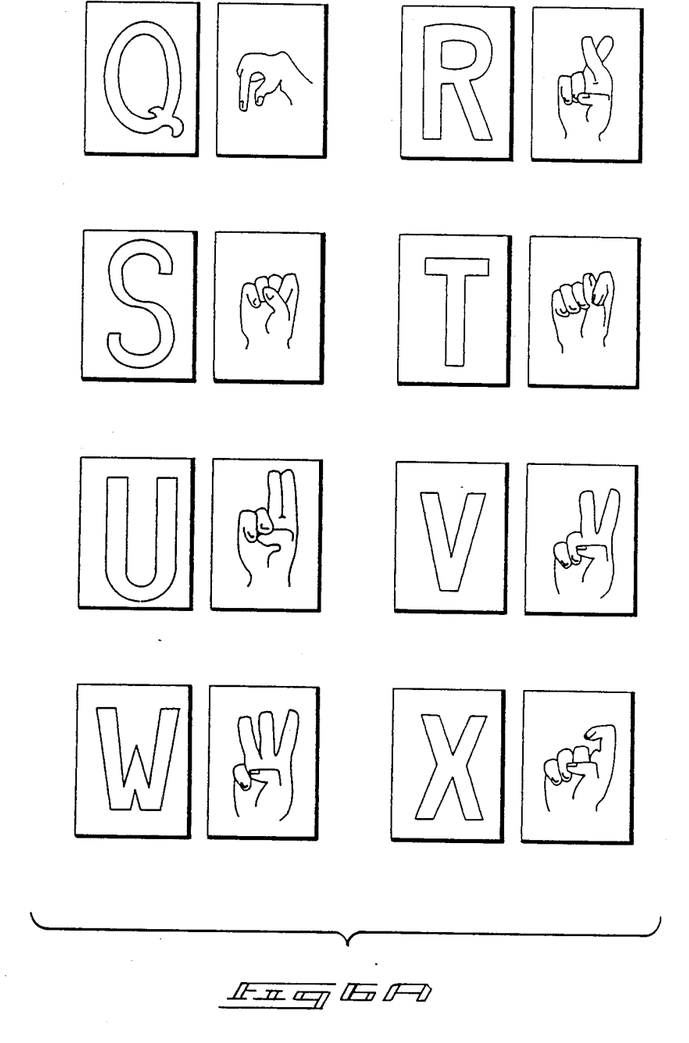
FIG. 6a is an orthographic illustration of the various letters in sign language designations therefore.
Figure 6B:
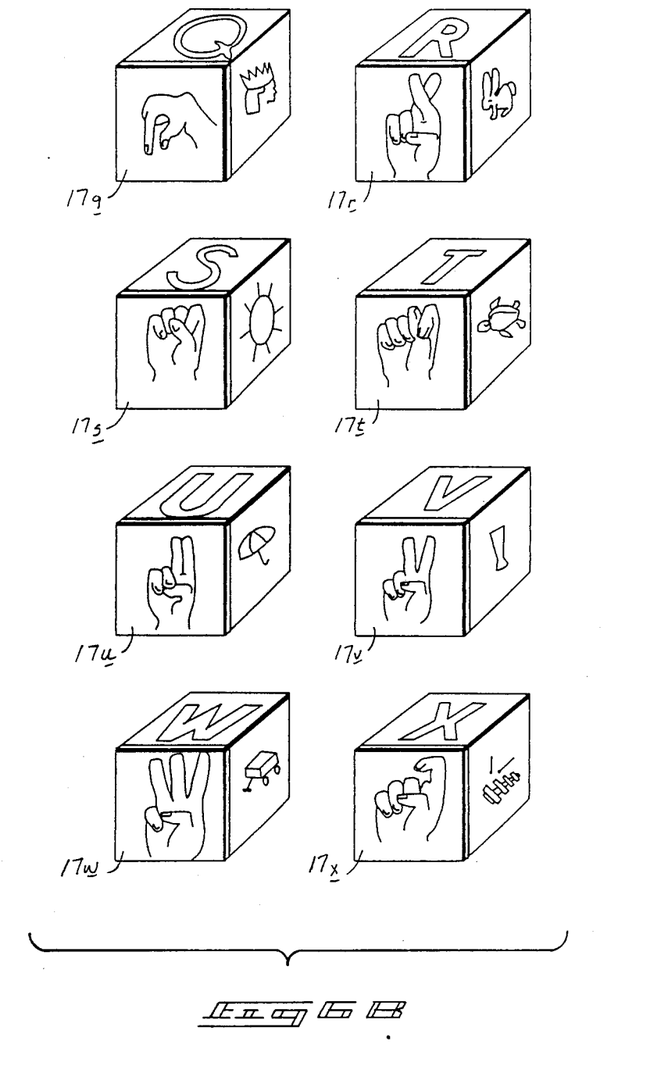
FIG. 6b is an isometric illustration of the sign language block faces secured to associated sign language blocks.

More specifically, it will be noted that the sign language blocks 10 each include an alphabet letter face 11 and a pictorial face 12. Reference to FIG. 1 illustrates the letter "A" and in associated graphic illustration of an apple to reinforce the letter designation. Each of the sign language blocks 10 further includes a securement face 13 formed with three recesses 14, 15, and 16 for matingly receiving an associated projection. Reference to FIG. 3 illustrates the array of recesses available to be formed within the surface of securement face 13. A diagonal array of five recesses 14a through 14e are oriented to bisect an apex formed by a vertical array of recesses 15a through 15d and horizontal array of recesses 16a through 16d. It is to be understood that only three recesses are formed within securement face 13 of the associated blocks. Therefore the mathematical permutations of recesses 14, 15, and 16 are arranged such that only the appropriate corresponding array of projections selected from the series of diagonal projections 18a through 18e, vertical projections 19a through 19d, and horizontal array of projections 20a through 20d. The projections illustrated diagrammatically in FIG. 3b are a mirror image of the recesses formed in diagrammatic illustration in FIG. 3. It is to be understood that only three recesses are formed within the surface 13 of the sign language block and will accept only the proper array of projections formed in the rear face of removable face 17. FIG. 2 is illustrative of a typical array of projections 18a, 19a, 20a to mate with associated recesses 14a, 15a, and 16a per the example of FIG. 1.

Figure 8:
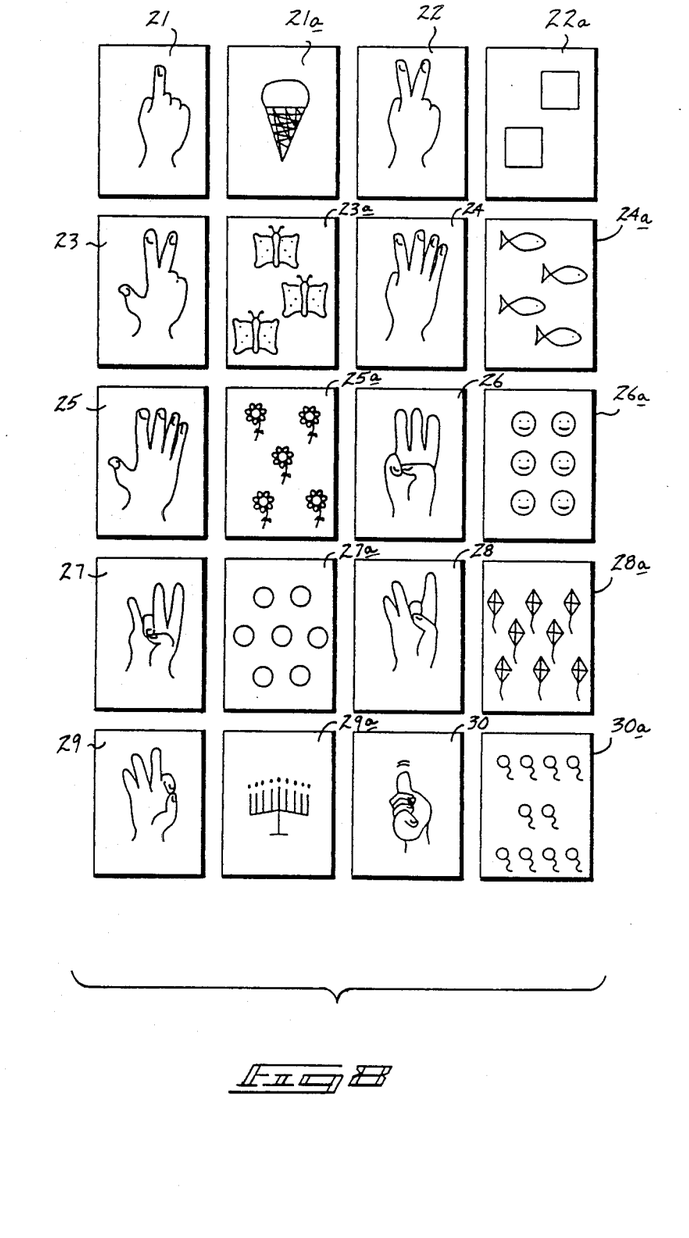
FIG. 8 is an orthographic illustration of the various digits and associated sign language designations therefore as may be utilized by the sign language blocks of the instant invention.

FIGS. 4a through 7b are illustrative of the blocks and associated faces 17a through 17zin use by the instant invention. FIG. 8 is illustrative of the numerical digits 1 through 10 that may also be utilized by the instant invention with a suitable matrix of projections associating with a complementary array of recesses.

It should be noted that the five diagonal recesses 14a through 14e, the four vertical recesses 15a through 15d, and the four horizontal recesses 16a through 16d are all as required to ensure a requiste number of mathematical permutations of recesses available to ensure that only the proper associated sign language designation per removable face 17 is properly accepted by the companion securement face 13 of an associated block 10.

For example, the letter "A" designation would utilize recesses 14a, 15a, and 16a, while the designation associated with letter "B" would use recesses 14a, 15b, and 16a, the letter "C" would use the designations 14a, 15c, and 16a and so forth to ensure that each alphabet letter and associated designation will be provided with a varying pattern of recesses and complementary projections to ensure that only the proper sign language designation may properly mate with the associated recesses formed within the sign language blocks 10 onto the securement faces 13. The use of five diagonal recesses and associated projections are utilized to enable usage of the numeral digits, as depicted on FIG. 8, and also provided varying patterns to properly associate a desired numeral designation 21 through 30 with an associated graphic illustration 21a through 30a.

The above invention enables reinforcement of the educational procedure by which an individual may fully appreciate the association of sign language designations and their associated meanings.

It should be noted that each of the projections 18a through 18e, 19a through 19d, and 20a through 20d are each formed orthogonally and outwardly relative to a rear surface of each of the removable faces 17. Each of the projections is formed with a resilient bulbous tip to be matingly and securely received within the recesses 14a through 14e and so forth as illustrated in FIG. 3a. The recesses are formed of a complementary configuration to the projections with a bulbous lowermost cavity formed and communicating with a cylindrical channel to receive the associated projections.

As to the manner of usage and operation of the instant invention, the same should be apparent from the above description, and therefore no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Sign language educational blocks for instructional teaching of sign language designations comprising,
   a plurality of sign language blocks wherein each of said blocks is formed with a letter face for illustration of a predetermined alphabet letter, and
   a pictorial face for presenting a predetermined illustration whose spelling begins with a predetermined alphabet letter, and
   a removable face removably and selectively securable to a securement face of one of said sign language blocks wherein said removable face is provided with an illustrative sign language designation corresponding to the predetermined alphabet letter.

2. Sign language educational blocks as set forth in claim 1 wherein the plurality of sign language blocks are defined by twenty-six blocks wherein each block includes a different letter of the alphabet and whose associated removable face is provided with a series of projections receivable within mating recesses of said securement face.

3. Sign language educational blocks as set forth in claim 2 wherein each removable face of each sign language block is provided with three projections receivable within three recesses of said securement face.

4. Sign language educational blocks as set forth in claim 3 wherein each projection is formed with a resilient bulbous tip receivable within a bulbous cavity communicating with a cylindrical channel to receive each projection.

5. Sign language educational blocks as set forth in claim 4 wherein each of the twenty-six sign language blocks is provided with a varying pattern of projections on its associated removable face and a complementary pattern of recesses within a corresponding securement face such that only an appropriate sign language designation may be received within a corresponding sign language block whose alphabet designation corresponds to the sign language designation.

6. Sign language educational blocks as set forth in claim 5 wherein each of the pattern of projections comprising three projections on a corresponding removable face is selected from a matrix pattern of projections defined by a diagonal array of projections, a vertical array of projections, and a horizontal array of projections.

7. Sign language educational blocks as set forth in claim 6 wherein each securement face provided with three recesses is selected from a matrix of recesses defined by a diagonal array of recesses, a vertical array of recesses, and a horizontal array of recesses.

* * * * *